US011917703B2

(12) United States Patent
Pati et al.

(10) Patent No.: US 11,917,703 B2
(45) Date of Patent: Feb. 27, 2024

(54) METHOD AND APPARATUS FOR CONFIGURING A SECONDARY CELL GROUP (SCG) IN A DUAL CONNECTIVITY (DC) MODE

(71) Applicant: Samsung Electronics Co., Ltd., Gyeonggi-do (KR)

(72) Inventors: Dibyajyoti Pati, Bangalore (IN); Raja Moses Manoj Kumar Eda, Bangalore (IN); Surendra Pandey, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/887,545

(22) Filed: May 29, 2020

(65) Prior Publication Data

US 2020/0383155 A1 Dec. 3, 2020

(30) Foreign Application Priority Data

May 31, 2019 (IN) .................. 201941021794 PS
May 24, 2020 (IN) .................. 201941021794 CS

(51) Int. Cl.
| H04W 76/15 | (2018.01) |
| H04B 17/318 | (2015.01) |
| H04B 17/336 | (2015.01) |
| H04L 1/20 | (2006.01) |
| H04W 24/10 | (2009.01) |
| H04W 76/18 | (2018.01) |

(Continued)

(52) U.S. Cl.
CPC .......... *H04W 76/15* (2018.02); *H04B 17/318* (2015.01); *H04B 17/336* (2015.01); *H04L 1/203* (2013.01); *H04W 24/10* (2013.01); *H04W 76/18* (2018.02); *H04W 76/30* (2018.02); *H04W 84/18* (2013.01)

(58) Field of Classification Search
CPC .... H04B 17/318; H04W 24/10; H04W 36/08; H04W 36/22; H04W 76/15; H04W 76/18; H04W 76/30; H04W 72/0413
USPC .................................. 370/252, 328, 331, 329
See application file for complete search history.

(56) References Cited

U.S. PATENT DOCUMENTS

| 2012/0281548 A1 | 11/2012 | Lin et al. |
| 2013/0122904 A1 | 5/2013 | Lee et al. |

(Continued)

FOREIGN PATENT DOCUMENTS

| KR | 1020130098268 | 9/2013 |
| KR | 1020150086593 | 7/2015 |
| WO | WO 2019/006707 | 4/2019 |

OTHER PUBLICATIONS

International Search Report dated Aug. 26, 2020 issued in counterpart application No. PCT/KR2020/006973, 10 pages.

(Continued)

*Primary Examiner* — Harun Chowdhury
(74) *Attorney, Agent, or Firm* — The Farrell Law Firm, P.C.

(57) ABSTRACT

A method and user equipment (UE) for configuring a secondary cell in a dual connectivity (DC) mode by a UE. The method includes connecting to a primary cell and the secondary cell based on configurations received from a network, identifying at least one parameter related to performance of the UE for the secondary cell, comparing the at least one parameter with a threshold and releasing connection with the secondary cell based on a result of the comparison.

10 Claims, 9 Drawing Sheets

(51) Int. Cl.
*H04W 76/30* (2018.01)
*H04W 84/18* (2009.01)

(56) References Cited

U.S. PATENT DOCUMENTS

| | | |
|---|---|---|
| 2015/0133122 A1 | 5/2015 | Chen |
| 2016/0345231 A1* | 11/2016 | Moon .................. H04W 36/22 |
| 2017/0164419 A1 | 6/2017 | Kim |
| 2017/0311312 A1* | 10/2017 | Koo .................. H04W 72/0413 |
| 2018/0035346 A1 | 2/2018 | Fujishiro et al. |
| 2018/0049085 A1* | 2/2018 | Hu ........................ H04W 36/08 |
| 2018/0160336 A1* | 6/2018 | Dai ...................... H04W 36/22 |
| 2018/0270713 A1 | 9/2018 | Park et al. |
| 2018/0352601 A1 | 12/2018 | Park et al. |
| 2019/0014529 A1 | 1/2019 | Karampatsis et al. |
| 2019/0052377 A1 | 2/2019 | Hwang et al. |
| 2019/0089579 A1 | 3/2019 | Sang et al. |
| 2019/0215756 A1* | 7/2019 | Park ...................... H04W 76/18 |

OTHER PUBLICATIONS

Indian Examination Report dated Nov. 8, 2021 issued in counterpart application No. IN 201941021794, p. 6.
Ericsson, "Secondary Radio Link Failure (S-RLF)", R2-141542, 3GPP TSG-RAN WG2 #85bis, Mar. 31-Apr. 4, 2014, 5 pages.
Huawei, HiSilicon, "SCG Recovery upon SN Failure for EN-DC", R2-1707417, 3GPP TSG-RAN WG2 Ad Hoc, Jun. 27-29, 2017, 2 pages.
KDDI Corporation, "Discussions on Reporting SCG-RLF towards MeNB", R2-141200, 3GPP TSG RAN WG2 Meeting #85bis, Mar. 31-Apr. 4, 2014, 2 pages.
European Search Report dated Jan. 31, 2022 issued in counterpart application No. 20812731.6-1231, 11 pages.

* cited by examiner

… (1)
METHOD AND APPARATUS FOR CONFIGURING A SECONDARY CELL GROUP (SCG) IN A DUAL CONNECTIVITY (DC) MODE

CROSS-REFERENCE TO RELATED APPLICATION(S)

This application is based on and claims priority under 35 U.S.C. § 119(a) to Indian Provisional Patent Application Serial No. 201941021794 (PS), filed on May 31, 2019 in the Indian Intellectual Property Office, and Indian Complete Patent Application Serial No. 201941021794 (CS), filed on May 24, 2020 in the Indian Intellectual Property Office, the disclosure of each of which is incorporated herein by reference in its entirety.

BACKGROUND

1. Field

The disclosure relates generally to wireless communication system, and more particularly, a method and an apparatus for configuring a secondary cell group (SCG) in a dual connectivity (DC) mode.

2. Description of Related Art

In recent years, wireless communication has gained huge importance due to rapid advancement in computer technologies and computer networks. With growing demand, many attempts have been made to develop an improved 5th-generation (5G) communication system to meet increasing need for wireless data traffic. Generally, the 5G communication system, especially operating in mmWave (modem, radio frequency (RF), and the like) consumes significantly more power compared to $4^{th}$-generation (4G) communication systems.

Currently, 5G deployment uses dual connectivity mechanism (evolved universal mobile telecommunication service (UMTS) radio access network (E-UTRAN) new radio (NR)—DC (ENDC) architecture), where a 5G cell is added by a 4G cell dynamically based on measurement reports shared by a user equipment (UE) associated with the 4G cell. Typically, adding/sustaining a 5G cell may be beneficial to the UE (considering the power it consumes) if a significant performance (such as, expected throughput, etc.) gain is obtained. However, there are multiple situations where the performance of the 5G cell may be good during an initial period of addition, but the performance gradually decreases due to various factors such as mobility, network load, mm-wave blockage, and the like. The decrease in the performance does not match with resources used by the UE (such as power, central processing unit (CPU), and the like).

In current live network scenarios, the ENDC architecture is applied where a new radio (NR) cell is added by 4G network in connected mode. Currently, most of the networks are adding the NR cell using a measurement report from the UE (i.e., the measurement report transmitted from the UE when a measured value of an NR cell in the UE is greater than a threshold). In many scenarios, the network does not remove the NR cell for the UE even when the signal strength of the UE is below the threshold and when performance (high block error ratio (BLER), high retransmissions, etc.) is very poor. This causes degradation of the performance of the UE in terms of throughput, battery drain, heating and the like. In addition, once the NR cell is added, there are many scenarios where keeping the NR cell active is not beneficial to the UE.

For instance, when the UE moves to poor NR signal coverage below the defined threshold, this causes data stall and high BLER, high retransmissions, leading to very low throughput and high current consumption with poor user experience. Also, if the UE is in a threshold edge scenario, there may be a back and forth of addition and release of the NR cell, as the addition of the NR cell may keep failing due to random access channel (RACH) failures at these instances.

Thus, adding the NR cell at such instances is not beneficial to the UE and causes the UE to perform poorly, which is not comparable to an LTE standalone UE in terms of throughput, power consumption, and the like. Currently, there is no mechanism for the UE to release the NR cell based on performance over the NR cell, even though the performance is poor and not comparable to an LTE standalone UE.

In existing systems, once the UE removes the NR cell due to the temperature limit, even though the UE was in a good NR coverage area, the UE would not be able to add and utilize the NR services. In addition, the existing systems do not consider any UE performances and key performance indicators (KPIs) (such as BLER, retransmissions, SNR, expected throughput, signal conditions, NR addition vs. gain, and the like). Also, the amount of resources the NR cell may utilize and may obtain by adding the NR cell is not considered (i.e., power consumption versus gain (expected throughput)).

SUMMARY

The present disclosure has been made to address at least the disadvantages described above and to provide at least the advantages described below.

In accordance with an aspect of the present disclosure, a method for configuring a secondary cell in a DC mode by a UE is provided. The method includes connecting to a primary cell and the secondary cell based on configurations received from a network, identifying at least one parameter related to a performance of the UE for the secondary cell, comparing the at least one parameter with a threshold and releasing connection with the secondary cell based on a result of the comparison.

In accordance with an aspect of the present disclosure, a UE is provided. The UE includes a transceiver configured to receive configurations from a network and at least one processor configured to connect to a primary cell and a secondary cell based on the received configurations, identify at least one parameter related to a performance of the UE for the secondary cell, compare the at least one parameter with a threshold and release connection with the secondary cell based on a result of the comparison.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1A:
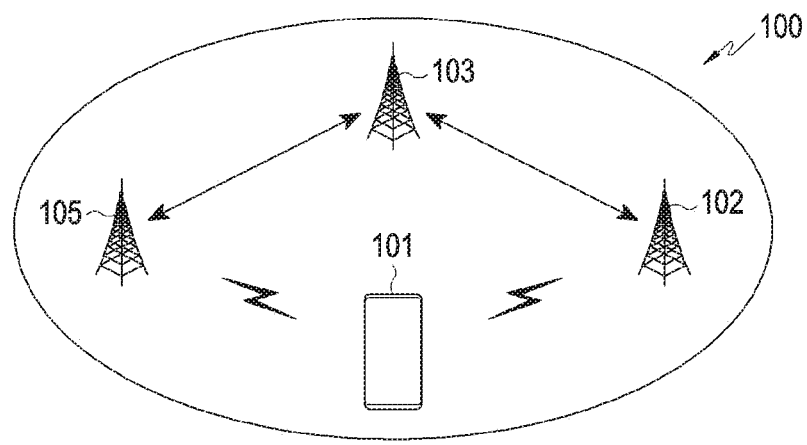
FIG. 1A illustrates an environment for dynamically configuring an SCG in a DC in a UE, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

Embodiments of the present disclosure relate to a method and a UE for configuring an SCG in a DC mode. The DC mode is a 3GPP release for small cell enhancement and is introduced to utilize radio resources within multiple carriers to improve UE throughput. The DC mode allows the UE to simultaneously transmit and receive data on multiple component carriers from two cell groups via a master cell group (MCG) and an SCG. The SCG may be defined as a group of serving cells associated with the secondary base station (eNB) (SeNB), including a PCell and optionally one or more SCell's. Currently, most of the networks are adding the SCG cell using a measurement report received from a UE (i.e., the measurement report transmitted from the UE when a measured value of an SCG cell in the UE is greater than a threshold). The event B1 in the DC mode is defined as when an inter radio access technology (RAT) neighbour cell becomes greater than a threshold, which is defined by the network during a measurement configuration. The event B1 is used by the network to add the SCG in an ENDC configuration.

In many scenarios, the network does not remove the SCG cell for the UE, even when the signal strength of the UE is below a threshold and when performance (high BLER, high retransmission rate, etc.) is very poor. This causes degradation of the performance of the UE in terms of throughput, battery drain, heating and the like. In addition, once the SCG is added, there are many scenarios where keeping the SCG active is not beneficial to the UE. Currently, there is no mechanism for the UE to release the SCG based on a performance of the UE (i.e., even though the performance is poor and not comparable to an MCG standalone UE).

The present disclosure is in ENDC deployment, where an SCG (e.g., an NR cell) is deployed as a DC mode with an MCG (e.g., LTE) (i.e., the MCG being constantly connected while the SCG is being added when the UE is near the SCG). In such a scenario, when signalling conditions and data rates become poor in the SCG, the connection with the SCG may not benefit the UE in terms of data rates from the SCG and may instead incur disadvantages in terms of power consumption and overheating. Thus, in such situations, when the SCG is not removed by network explicitly, the UE in the present disclosure may release the SCG internally by triggering an SCG failure. On the other hand, even when the signalling conditions are good and the throughput requirement by the UE is low, an MCG is already in a connected state in an ENDC mode. The signalling conditions such as network bandwidth and the like are detected to calculate the throughput of the UE which can be achieved with the MCG based on the UE and network parameters. In this case, the MCG can cater to current data requirements of the UE based on the calculated throughput, and the UE may release the SCG internally. In addition, the SCG may be added based on the requirement by the UE.

Thus, the UE minimizes the time required on the SCG while maximizing performance of the UE in DC mode type of scenarios. Hence, by internally triggering the release of the SCG based on the situation, the UE spends less time on the SCG, thus saving power as well as reducing thermal impact without deteriorating the user experience.

FIG. 1A illustrates an environment for dynamically configuring an SCG in a DC in a UE, according to an embodiment.

As shown in FIG. 1A, an environment 100 relates to wireless communication and includes a UE 101 connected to a network device 103. The network device 103 is a base station for providing network services. The base station is a fixed point of communication for UE on a carrier network. The UE 101 is in DC mode (ENDC architecture), where an SCG 105 may be deployed as DC with the MCG 102 being constantly connected while the SCG 105 is being added when the UE is near to the SCG for wireless communication. The wireless communication may include different generations such as, $2^{nd}$ generation (2G), 3rd generation (3G), LTE, 5G, $6^{th}$ generation (6G) and non-3GPP technologies.

The SCG 105 may be defined as a group of serving cells associated with an SeNB, including a PCell and optionally one or more SCells. The MCG 102 is a group of serving cells associated with the MeNB, including the PCell and optionally one or more SCells. The MCG 102 may be an LTE cell and the SCG 105 may be an NR cell. The MCG 102 is an NR cell and the SCG 105 is an LTE cell, or both the MCG 102 and the SCG 105 may be LTE cells or NR cells. A person skilled in the art would understand that the UE 101 may operate DC in any combination of cell.

The UE 101 may dynamically perform one of removal and addition of the SCG cell The UE 101 may include, but is not limited to, a laptop, a computer, a PDA, a notebook, a smartphone, a tablet, and any other user computing devices. A person skilled in the art would understand that, any other devices, not mentioned explicitly, may also be used as the UE 101 in the present disclosure.

Figure 1B:
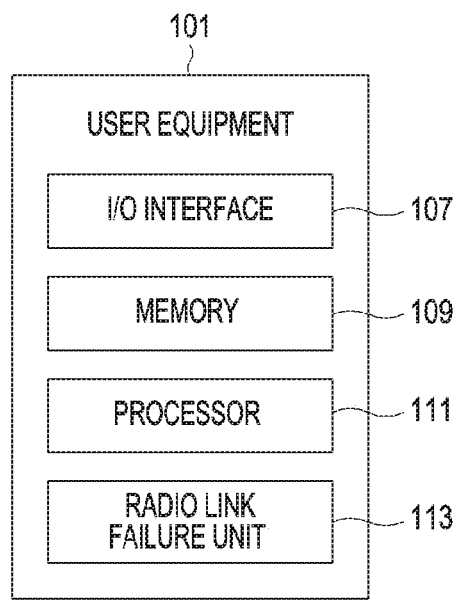
FIG. 1B illustrates a representation of a UE, according to an embodiment.

FIG. 1B illustrates a representation of a UE, according to an embodiment. As shown, the UE 101 may include an I/O interface 107, a memory 109, a processor 111 and an internal radio link failure (RLF) unit 113. The I/O interface 107 may be configured to receive configurations and any other information from the network device 103 and from the MCG 102 and the SCG 105. The configurations and other information received by the I/O interface 107 may be stored in the memory 109. The memory 109 may be communicatively coupled to the processor 111 of the UE 101. The memory 109 may also store processor instructions which may cause the processor 111 to execute the instructions for dynamically configuring an SCG in a DC mode.

Returning to FIG. 1A, during a data transmission process, the network device 103 may configure configurations for the SCG 105 addition based on cell coverage for the UE 101 during mobile condition. The cell coverage may be determined based on an optimal performance of the UE 101 and the network device 103. Generally, the network device 103 may add the SCG 105 to the UE 101 when signal conditions of the UE 101 for the SCG 105 are high compared to other configurations, where the configurations may be for data transmission or a reception requirement of the UE 101.

The network device 103 may add the SCG cell 105 based on a measurement report received from the UE 101 or sometimes without measurement configuration. Typically, the measurement report may include multiple measurement items (such as, a reference signal received power (RSRP), a reference signal received quality (RSRQ), a signal to interference and noise ratio (SINR), etc.) for measuring the signal quality of the MCG 102. For the UE 101 to send the measurement report, the network device 103 may first configure the UE 101 with an NR frequency mapped with event B1. Once configurations configured by the network device 103 are met by the UE 101, the measurement report is transmitted by the UE 101. Accordingly, on receipt of the measurement report, the network device 103 may connect with the MCG 102 and the SCG cell 105.

Thus, the UE 101 connects to the MCG 102 and the SCG 105 based on the configurations received from the network device 103. The configurations may include, but are not limited to, the B2 event, an A2 event, A3 event, and the like. The event B1 is used by the network device 103 to add the NR cell 103 in the ENDC configuration. The event B1 (or B1 threshold) is added by the network device 103 to connect to the SCG 105. The event A2 is configured by the network device 103 for checking if the signal strength of serving cell becomes worse than the configured configuration (that may or may not be configured by the network), and event A3 is used to check if an SCG 105 becomes more offset than the MCG 102. A person skilled in the art would understand that the configurations may include any other events and information not disclosed herein explicitly.

Once the UE 101 is connected in the DC mode with the MCG 102 and to the SCG 105, the UE 101 may calculate a plurality of threshold values (for network parameters and a plurality of UE parameters). In such a situation, the UE 101 may initiate a data session (i.e., data transmission or reception) using either the MCG 102 or the SCG 105. When the UE 101 initiates the data session with the network device 103 using the SCG 105, the UE 101 checks the performance and determines if the performance when connected to the SCG 105 is below a predefined threshold. The predefined threshold is determined by the UE 101 based on at least one of a threshold for B1 event, a current RSRP, a future RSRP (which may be estimated by monitoring signal strength and network parameters over a period of time), the UE temperature, timer expiration, the UE transmission power, a number of retransmissions, an RSRQ, a packet decoding rate, a retransmission rate, throughput, an SINR and a BLER. The RSRP refers to a measurement of the received power level in a cell network. The RSRQ is an E-UTRA measurement defined as in Equation (1):

$$N \times RSRP/(E\text{-UTRA carrier RSSI}) \quad (1)$$

where "N" is the number of resource blocks (RBs) of an E-UTRA carrier received signal strength indicator (RSSI) measurement bandwidth. The RSRQ is used as part of the radio resource control (RRC) measurement process when evaluating cells. The SINR is a quantity used for giving theoretical upper bounds on channel capacity (or the rate of information transfer) in wireless communication systems such as networks. For example, a threshold for the parameter RSRP may be −105 dBm and a threshold for BLER can be >50% for a predefined time period. Similarly, the UE 101 can determine a threshold of a data transmission rate based on an application used dynamically, and the like.

The UE may receive an application request to start a data session with the SCG cell. The UE 101 may determine the performance of the UE when connected to the SCG for a first predefined time period by starting a hysteresis first timer. In addition, the UE 101 may also determine the performance when connected to the MCG 102. Particularly, the UE 101 checks the performance of the UE 101 with the MCG 102. The UE may detect the determined UE performance when connected to the SCG to be below a predefined threshold and may determine the UE performance when connected to the MCG to be below/above the predefined threshold. Determining the performance may include estimating/evaluating the performance. When the UE 101 determines that the performance of the UE 101 when connected with the MCG 102 is above the threshold, the UE 101 may initiate an initiate an RLF to the radio link control (RLC) unit 113 to remove the SCG 105 from the UE 101.

Particularly, the UE 101 initiates the RLF by indicating at least one of a poor RSRP/RSRQ, an RACH issue, a synchronization issue, or an SCG configuration failure. In addition, the RLF is initiated to disconnect with the SCG 105 when the UE 101 has not received the A2 configuration from the network device 103. For instance, based on the comparison, if the UE 101 is operating below −105 dBm, which is the threshold for the parameter RSRP, operating below the threshold may cause issues like RACH failures, back and forth exchanges, data stall, power consumption, and the like. Thus, in such a situation, the UE 101 may trigger the command to the internal RLF unit 113 to remove the SCG 105 after expirations of the first predefined time period. Further, upon initiating the RLF, the UE 101 may block transmission of the measurement report of the UE 101 until expiration of a second predefined time period. Thereafter, the UE 101 may continue the data session with the network 103 using the MCG 102 after the RLF is completed. Upon expiration of the second predefined time period, the UE 101 checks if the SCG 105 satisfies configurations received from the network device 103. When the configurations are met, the UE 101 may unblock the transmission of the measurement report and trigger a command to the network device 103 to connect with the SCG 105.

On the other hand, if the UE 101 determines that the performance when connected to the SCG 105 and to the MCG 102 is above the predefined threshold, the UE 101 may check a requirement and whether the performance is sufficient to complete the data session using the MCG 102 with comparable user experience. If the performance is sufficient with the MCG 102, the UE 101 may initiate the RLF to disconnect with the SCG 105.

The UE 101 may determine the UE performance when connected to the SCG 105 and the UE performance when connected to the MCG 102 to be below the predefined threshold. The UE 101 may initiate an initiate an RLF to the RLC unit 113 to remove the SCG 105 from the UE 101. Particularly, the UE 101 initiates the RLF by indicating at least one of a poor RSRP/RSRQ, an RACH issue, synchronization issues, or an SCG configuration failure. The RLF is initiated by the UE 101 as being connected to the SCG in such a way that would lead to UE resource wastage as well as issues like RACH failures, back and forth exchanges, data stall, power consumption temperature increase, and the like. The UE 101 discontinues the data session with MCG 102 as it would avoid facing the above issues.

Figure 2:
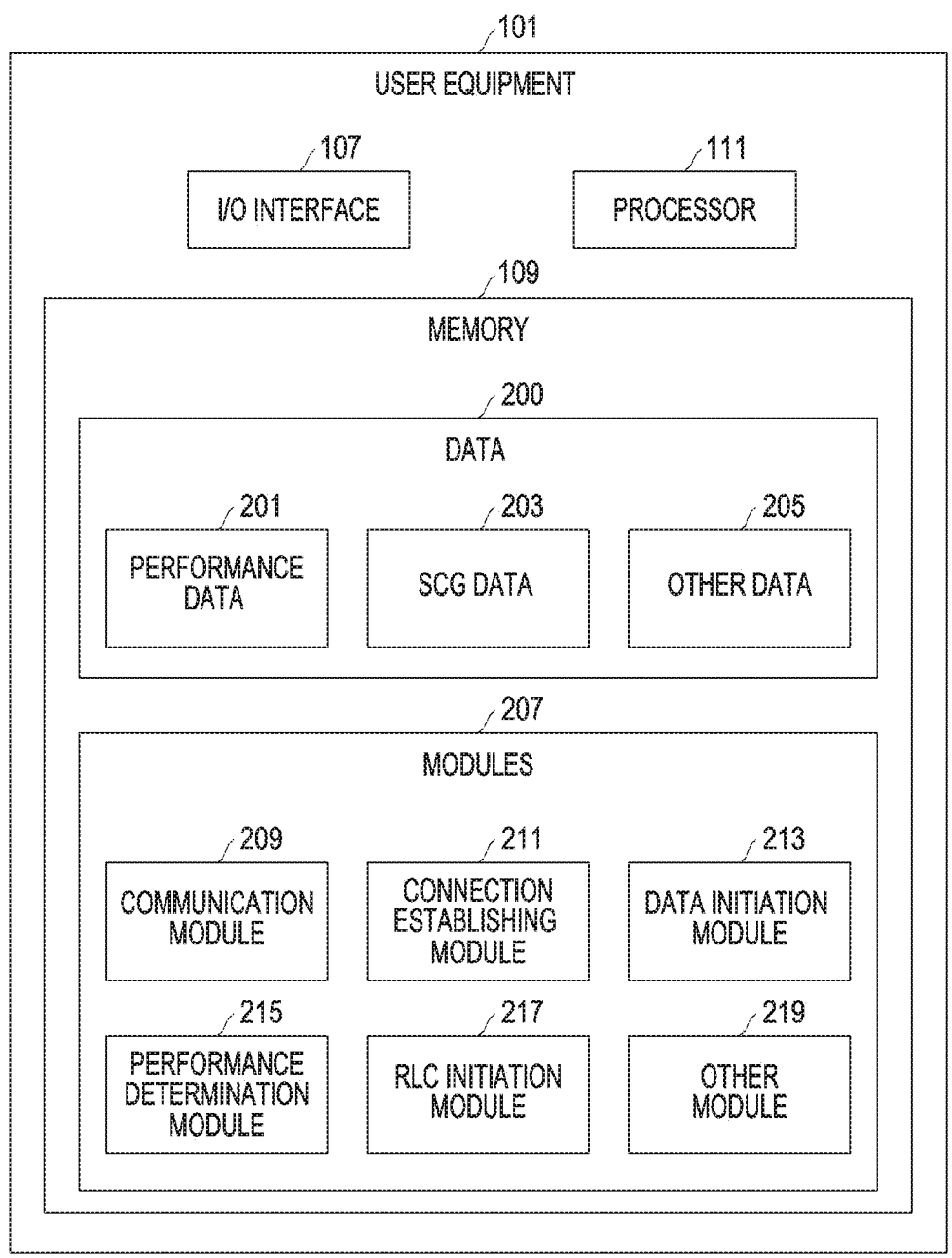
FIG. 2 is a detailed block diagram of a UE, according to an embodiment.

FIG. 2 is a detailed block diagram of a UE, according to an embodiment.

The UE 101 may include data 200 and one or more modules 207 which are described herein in detail. Data 200 may be stored within the memory 109. The data 200 may include performance data 201, SCG data 203 and other data 205.

The performance data 201 may include information about parameters indicative of UE performance. The parameters may include a threshold for B1 event, a current RSRP, a future RSRP (which may be estimated by monitoring signal strength and network parameters over a period of time), the UE temperature, timer expiration details, the UE transmission power, the number of retransmissions, the RSRQ, the packet decoding rate, the block error rate, the retransmission rate, throughput, the SINR, BLER counters and timers. The information may include the predefined threshold for each of the parameters as defined by the UE 101.

The SCG cell data 203 may include information regarding signal condition for the UE 101.

The other data 205 may store data, including temporary data and temporary files, generated by modules 207 for performing the various functions of the UE 101.

The data 200 in the memory 109 are processed by the one or more modules 207 present within the memory 109 of the UE 101. The one or more modules 207 may be implemented as dedicated units. In some implementations, the one or more modules 207 may be communicatively coupled to the processor 111 for performing one or more functions of the UE 101.

The one or more modules 207 may include, but are not limited to a communication module 209, a connection establishment module 211, a data initiation module 213, a performance determination module 215 and an RLC initiation module 217. The one or more modules 207 may also include other modules 219 to perform various miscellaneous functionalities of the UE 101. The other modules 219 may include blocking module for blocking the transmission of the measurement report of the UE 101.

The communication module 209 may obtain configurations from the network device 103. The configurations may be obtained in real-time or periodically. Further, the communication module 209 may also transmit a measurement report of the UE 101 and commands from the UE 101 to the network device 103.

The connection establishment module 211 may establish the connection with the MCG 192 and the SCG 105 based on the configurations received from the network device 103. The connection establishment module 211 may utilise existing known techniques for establishing the connection.

The data initiation module 213 may initiate the data session either with the SCG 105 or the MCG 102.

The performance determination module 215 may determine the performance of the UE 101 when connected with the SCG 105 and when connected with the MCG 102. The performance determination module 215 may determine the performance by checking the parameters with respective predefined thresholds with the first predefined time period. The first predefined time period may be thirty seconds. The UE performance when connected to the SCG and to the MCG are determined either in real-time or periodically. Particularly, the performance determination module 215 may check if performance of the UE 101 when connected with the SCG 105 is below/above the predefined threshold. Likewise, the performance determination module 215 may check whether the performance of the UE 101 when connected with the MCG 102 is below/above the predefined threshold.

The RLF initiation module 217 may initiate the RLC to the RLC unit 113 based on an output of the determination of the performance of the UE 101. For instance, if the UE 101 determines that the performance when connected to the SCG 105 is below the predefined threshold and simultaneously (or after a time period) if performance of the UE 101 when connected with the MCG 102 is above the threshold, the RLF initiation module 217 may initiate the RLC unit 113 to disconnect the SCG 105 from the UE 101. Particularly, RLF initiation module 217 may indicate at least one of the poor RSRP/RSRQ, a RACH issue, synchronization issues, and an SCG configuration failure while initiating the RLF. Upon disconnecting, the RLC initiation module 217 may also notify the data initiation module 213 to continue the data session with the network 103 using the MCG 102. Subsequently, the RLF initiation module 217 may also notify the blocking module to block the transmission of the measurement report of the UE 101 until expiration of the second predefined time period from a second timer. The second predefined time period may be two minutes. Once the second predefined time period is expired, the RLF initiation module 217 may check the outcome of the performance and trigger the command to the network device 103 to add the SCG cell 105.

If the performance of the UE 101 when connected to the SCG 105 and to the MCG 102 is above the predefined threshold, the RLF initiation module 217 may check requirements for the data session and if the performance is sufficient to complete the data session using the MCG 102. If the performance is sufficient with the MCG 102, the RLF initiation module 217 may initiate the RLF to disconnect with the SCG 105.

The first predefined time period and the second predefined time period values are representative in nature. The value of the first predefined time period may be based on the performance of the UE 101 with SCG 105 and probability of it to improve. The first time period is determined to avoid RLF in cases of instantaneous jitters/fluctuations in the signal strength. Also, the first time period is determined to avoid RLF in cases where the UE performance when connected to SCG becomes better after a short duration. The value of the second predefined time period may be based on the performance of the UE 101 when connected to the SCG 105. If the SCG 105 is monitored to have frequent issues or to be poor for an extended period of time, then the second predefined time period is kept high or long.

Figure 3:
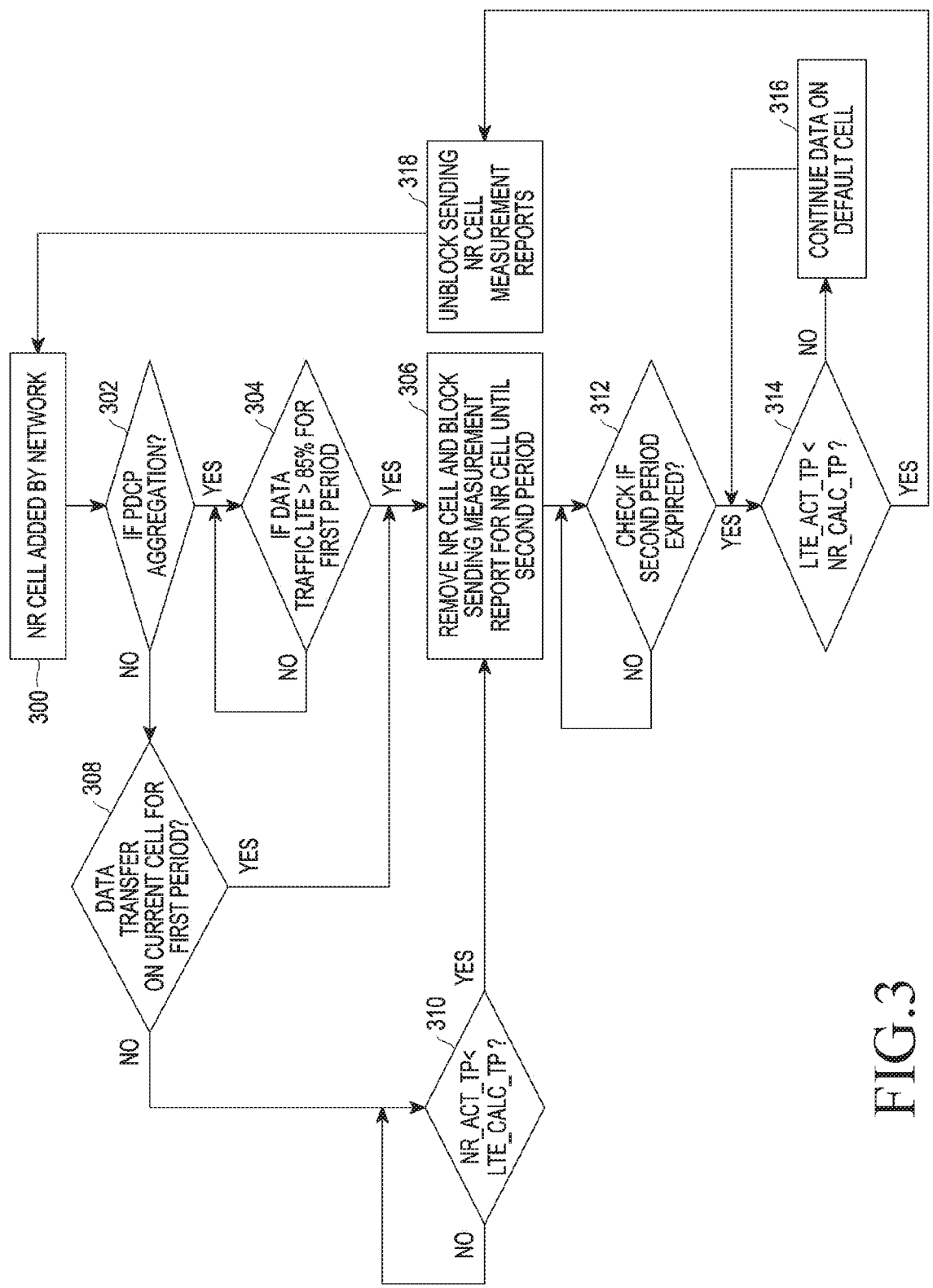
FIG. 3 is a flowchart for configuring an SCG in the UE based on the data transmission rate, according to an embodiment.

FIG. 3 is a flowchart for configuring an SCG in the UE based on the data transmission rate, according to an embodiment. As shown in FIG. 3, the RLF initiation module 217 may trigger the command to the internal RLF unit 113 to remove the SCG 105 after expiration of the first predefined time period. The command may be triggered when the data transmission is performed using the SCG 105 and current throughput for data transmission over the SCG 105 is detected to be less than a calculated throughput on the MCG 102. Further, the RLF initiation module 217 may trigger the blocking module to block transmission of the measurement report of the UE until expiration of the second predefined time period. Once the second predefined time period is expired, the RLF initiation module 217 may check the outcome of the performance determination and trigger unblocking of the transmission of the measurement report upon detecting the throughput data transmission over the MCG 102 to be less than the calculated throughput on the SCG 105.

The UE 101 may achieve throughput speeds of 20 Mbps considering 10% of scheduling with 256 QAM, 2 layers and 20 Mhz bandwidth. When the UE 101 is using fewer data applications for browsing or chatting applications, the UE 101 may not require speeds greater than 1 Mbps. Such scenarios may not require the SCG 105 to be added, as keeping two stacks alive may increase the power consumption of the UE and cause an overheating problem on the UE 101 due to high antenna elements used for beamforming. Moreover, in FR2 frequencies, the average power consumed by the UE 101 is high compared to the MCG 102 FR1 frequencies. Hence, removing the SCG 105 in such scenarios may help the UE 101 in reducing power consumption and overheating problems.

Specifically, referring to FIG. 3, at step 300, the UE identifies an NR cell added by a network. At step 302, the UE determines whether packet data convergence protocol (PDCP) aggregation is performed. That is, the UE determines whether data activity over an LTE leg and an NR leg at a PDCP level is performed. If the PDCP aggregation is performed, the UE determines whether data traffic over the LTE leg is greater than a predetermined value (e.g., a value corresponding to 85% of a total data traffic) for a first period at step 304.

If the data traffic over the LTE leg is greater than the predetermined value for the first period, at step 306, the UE removes the NR cell (or the UE releases the NR cell by transmitting 'SCG Failure Information' message) and blocks sending measurement report for the NR cell until a second period starts. If the data traffic over the LTE leg is equal to or less than the predetermined value for the first period, the UE continues to perform the data activity over the LTE leg and the NR leg.

At step 308, if the PDCP aggregation is performed, the UE determines whether data transfer is performed on a current cell (i.e., the LTE cell) for the first period. If the data transfer is performed on the current cell for the first period, the UE performs step 306. In other words, the UE removes the NR legs if the NR cell is added and data activity is performed over the LTE leg only for the first period.

If the data transfer is not performed on the current cell for the first period, at step 310, the UE determines whether ongoing expected data throughput over the NR cell (NR_ACT_TP) is less than LTE throughput (LTE_CALC_TP) calculated based on an estimation algorithm. If the NR_ACT_TP is less than the LTE_CALC_TP, the UE performs step 306.

At step 312, the UE checks whether the second period has expired. If the second period has expired, at step 314, the UE determines whether ongoing expected data throughput over the LTE cell (LTE_ACT_TP) is less than the NR throughput (NR_CALC_TP) calculated based on an estimation algorithm. If the LTE_ACT_TP is equal to or greater than the NR_CALC_TP, at step 316, the UE continues to perform the data activity over a default cell (i.e. the LTE cell or leg). If the LTE_ACT_TP is less than the NR_CALC_TP, the UE unblocks sending the measurement report for the NR cell at step 318.

The performance determination module 215 may determine the UE performance when connected to the SCG 105 and the UE performance when connected to the MCG 102 to be both below the predefined threshold. The RLF initiation module 217 may initiate an RLF to remove the SCG 105 from the UE 101. Particularly, the RLF initiation module 217 initiates the RLF by indicating at least one of a poor RSRP/RSRQ, a RACH issue, synchronization issues, or an SCG configuration failure. The RLF is initiated as being connected to the SCG such that it would lead to UE resource wastage and issues like RACH failures, back and forth exchanges, data stall, power consumption temperature increase, and the like. The UE 101 then continues the data session with MCG 102 as it would avoid facing the above issues.

Figure 4:
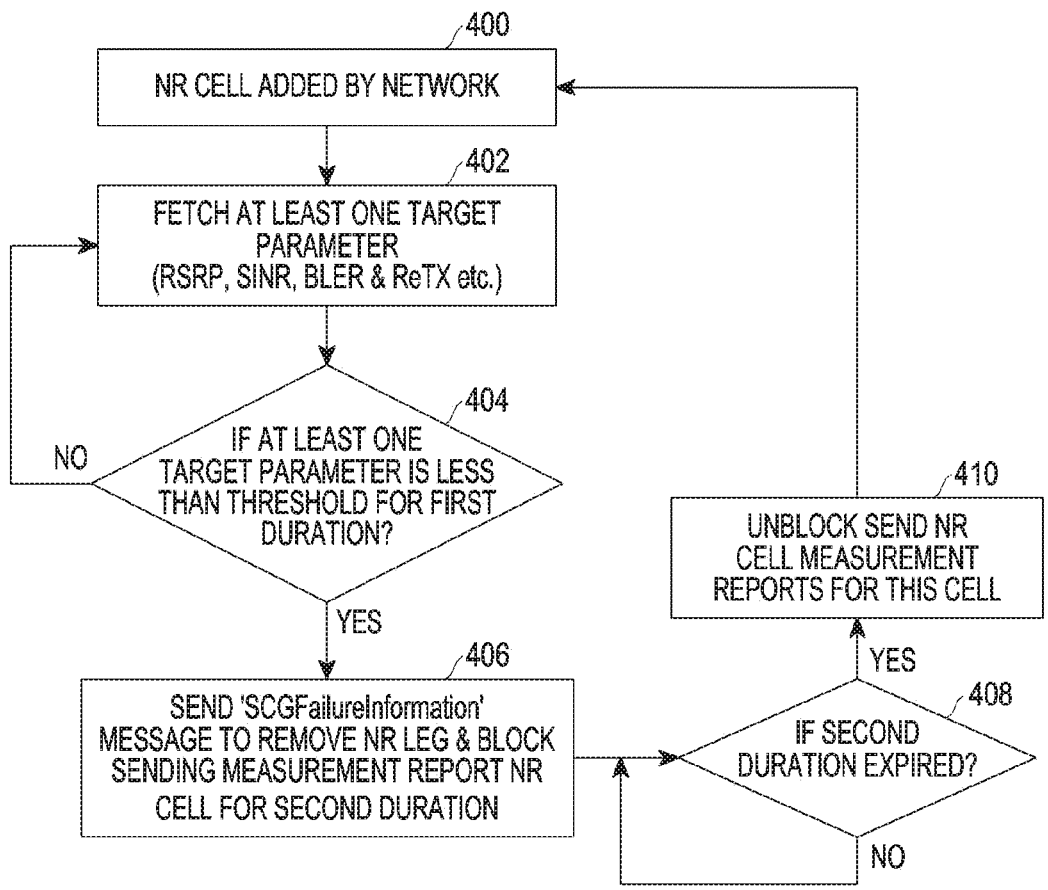
FIG. 4 is a flowchart for configuring an SCG based on a threshold, according to an embodiment.

FIG. 4 is a flowchart for configuring an SCG based on a threshold, according to an embodiment. Referring to FIG. 4, at step 400, the UE identifies an NR cell added by a network. At step 402, the UE fetches and identifies at least one target parameter related to the NR cell. The at least one target parameter may include at least one of RSRP, RSRQ, SINR, BLER and retransmission rate.

At step 404, the UE determines whether the at least one parameter is less than a threshold for a first duration. For example, the UE determines whether the RSRP for the NR cell is less than the threshold (e.g. a B1 threshold) for the first duration. The B1 threshold may be determined by the network based on a cell coverage. The cell coverage may be determined based on optimal performance of the UE and the network. When the RSRP for the NR cell goes beyond the B1 threshold, device performance (expected throughput, latency, back and forth exchanges, etc.) is very poor and high power consumption occurs. To overcome this, the B1 threshold is provided as a criterion for determining whether to remove the NR cell.

If the at least one parameter is less than the threshold for the first duration, at step 406, the UE sends the 'SCGFailureInformation' message to remove the NR leg, and blocks sending measurement report for the NR cell for a second duration.

Meanwhile, other criteria may be applied to target parameters of the BLER or the retransmission rate. For example, the UE determines whether the BLER for the NR cell is greater than a B2 threshold (e.g., 50%) for the first duration, and performs step 406 if the BLER for the NR cell is greater than the B2 threshold. Also, the UE determines whether the retransmission rate for the NR cell is greater than a B3 threshold (e.g., 50%) for the first duration, and performs step 406 if the retransmission rate for the NR cell is greater than the B3 threshold.

At step 408, the UE determines whether the second duration has expired. If the second duration has expired, at step 410, the UE unblocks sending NR cell measurement reports for the NR cell.

Figure 5:
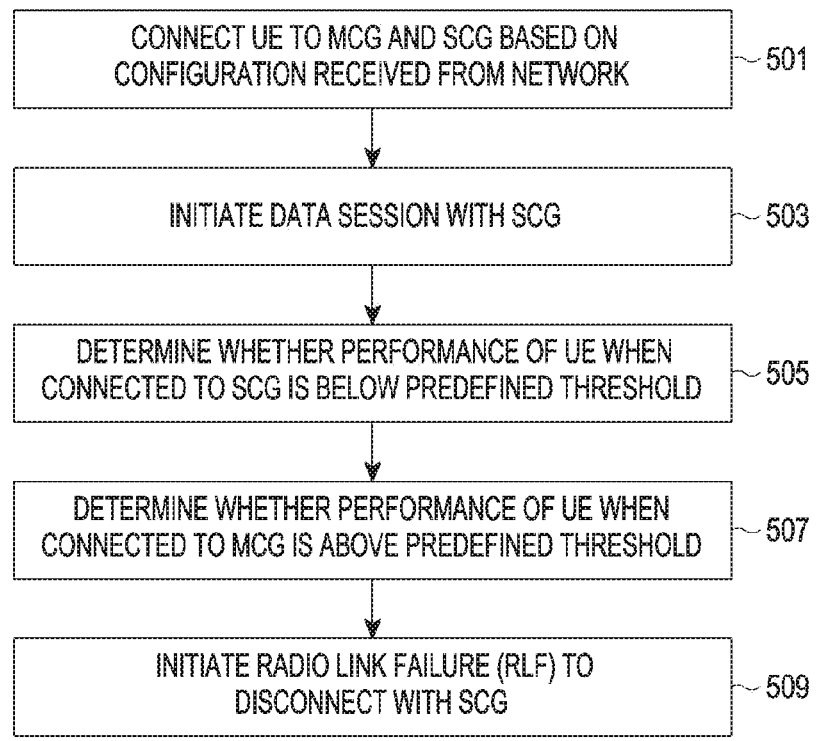
FIG. 5 is a flowchart for a method for dynamically configuring SCG in a DC in a UE, according to an embodiment.

FIG. 5 is a flowchart for a method for dynamically configuring SCG in a DC in a UE, according to an embodiment.

As illustrated in FIG. 5, the method includes one or more blocks for configuring an SCG in a DC mode. The method may be described in the general context of computer executable instructions. Generally, computer executable instructions can include routines, programs, objects, components, data structures, procedures, modules, and functions, which perform particular functions or implement particular abstract data types.

The order in which the method is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 501, the UE 101 is connected, by the connection establishing module 211 to the MCG 102 and the SCG 105 based on the configurations received from the network device 103.

At step 503, the UE initiates, by the data initiation module 213, a data session with the network device 103 using the SCG 103.

At step 505, the UE determines, by the performance determination module 215, whether performance of the UE 101 when connected to the SCG 105 is below the predefined threshold for the first time period.

At step 507, the UE determines, by the performance determination module 215, whether performance of the UE 101 when connected to the MCG 102 is above the predefined threshold.

At step 509, the UE initiates the RLF by the RLF initiation module 217 to disconnect with the SCG.

Figure 6A:
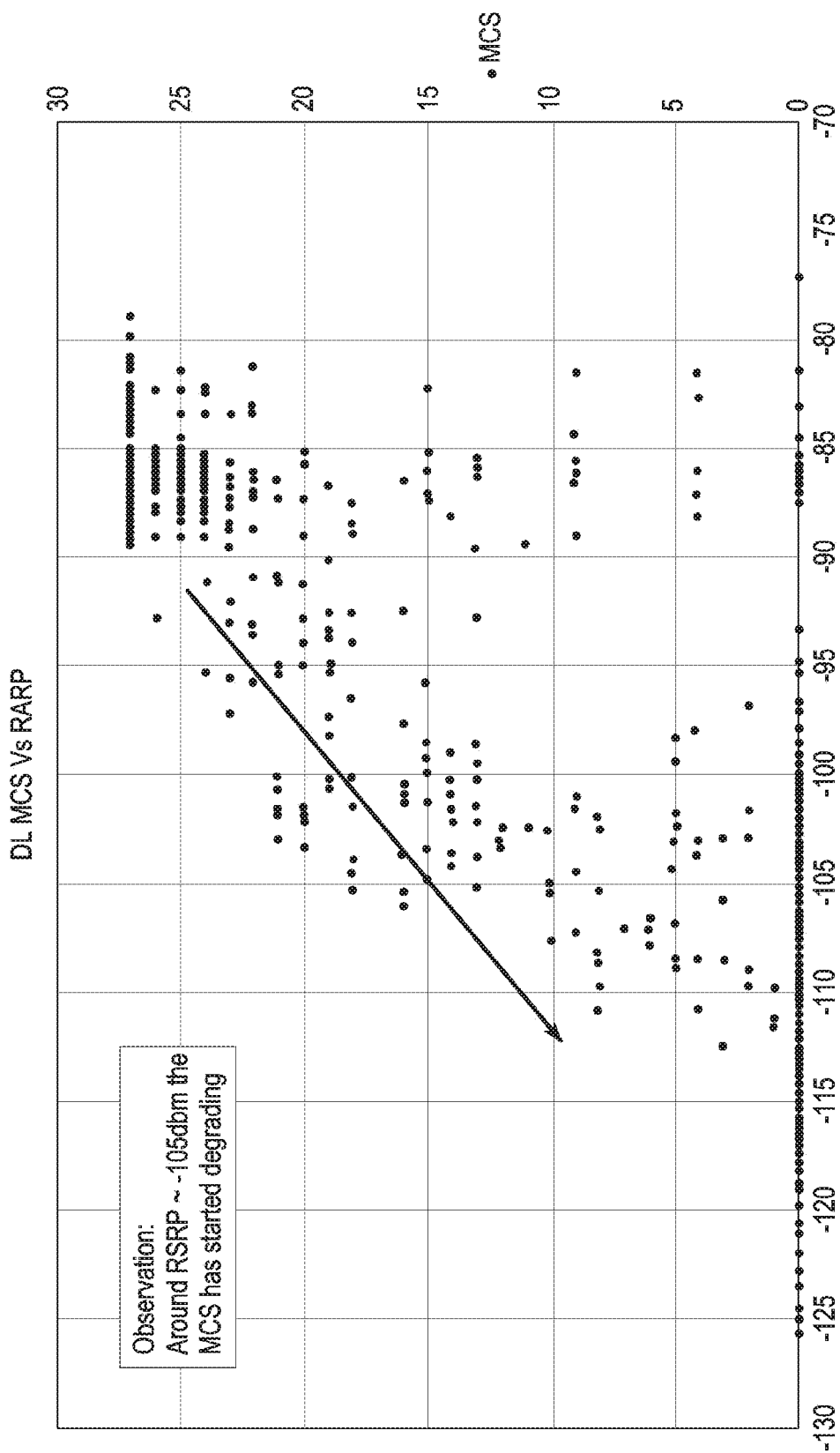
FIGS. 6A, 6B and 6C are use case graphs during managing removal and addition of NR cells in a UE, according to an embodiment.
Figure 6B:
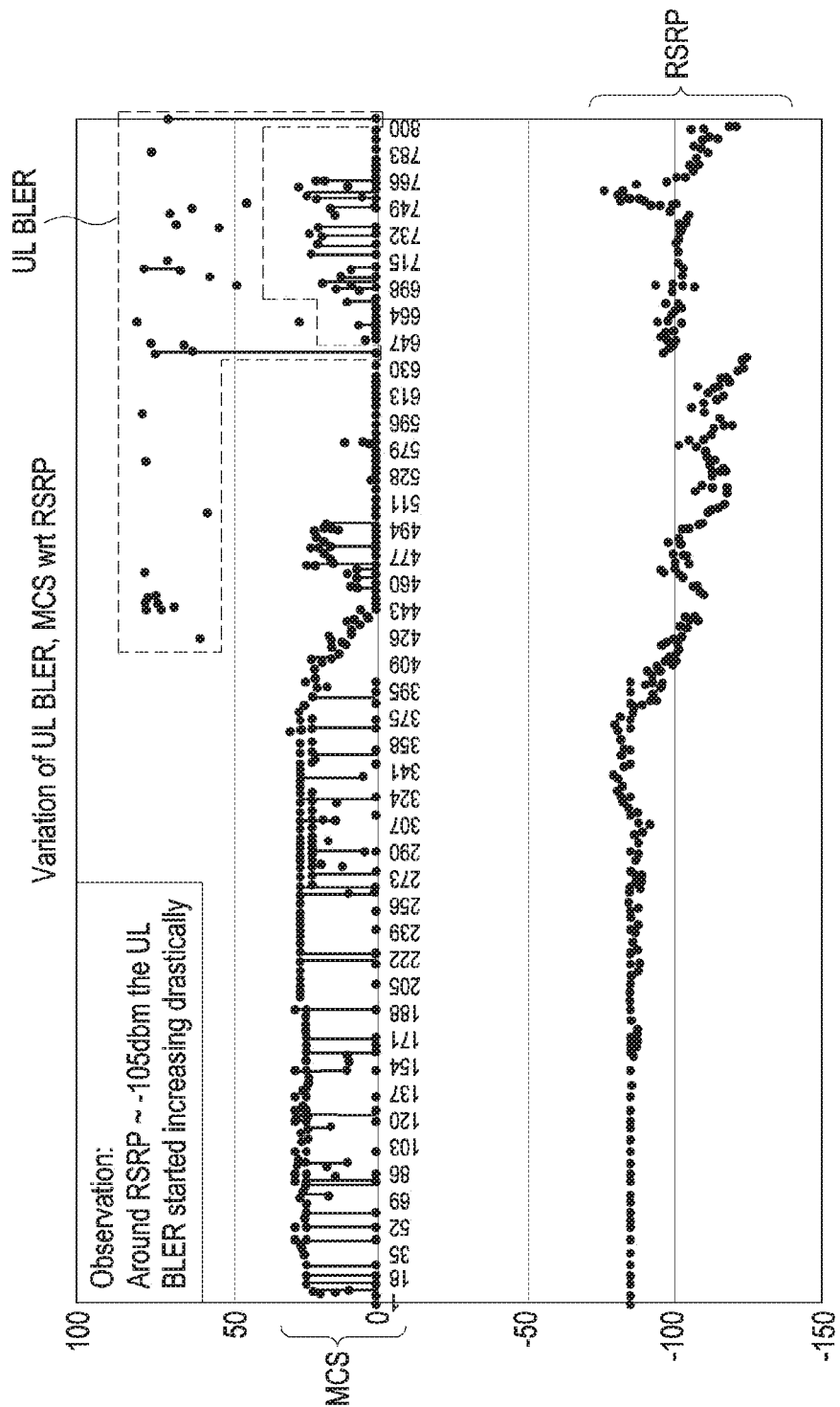
Figure 6C:
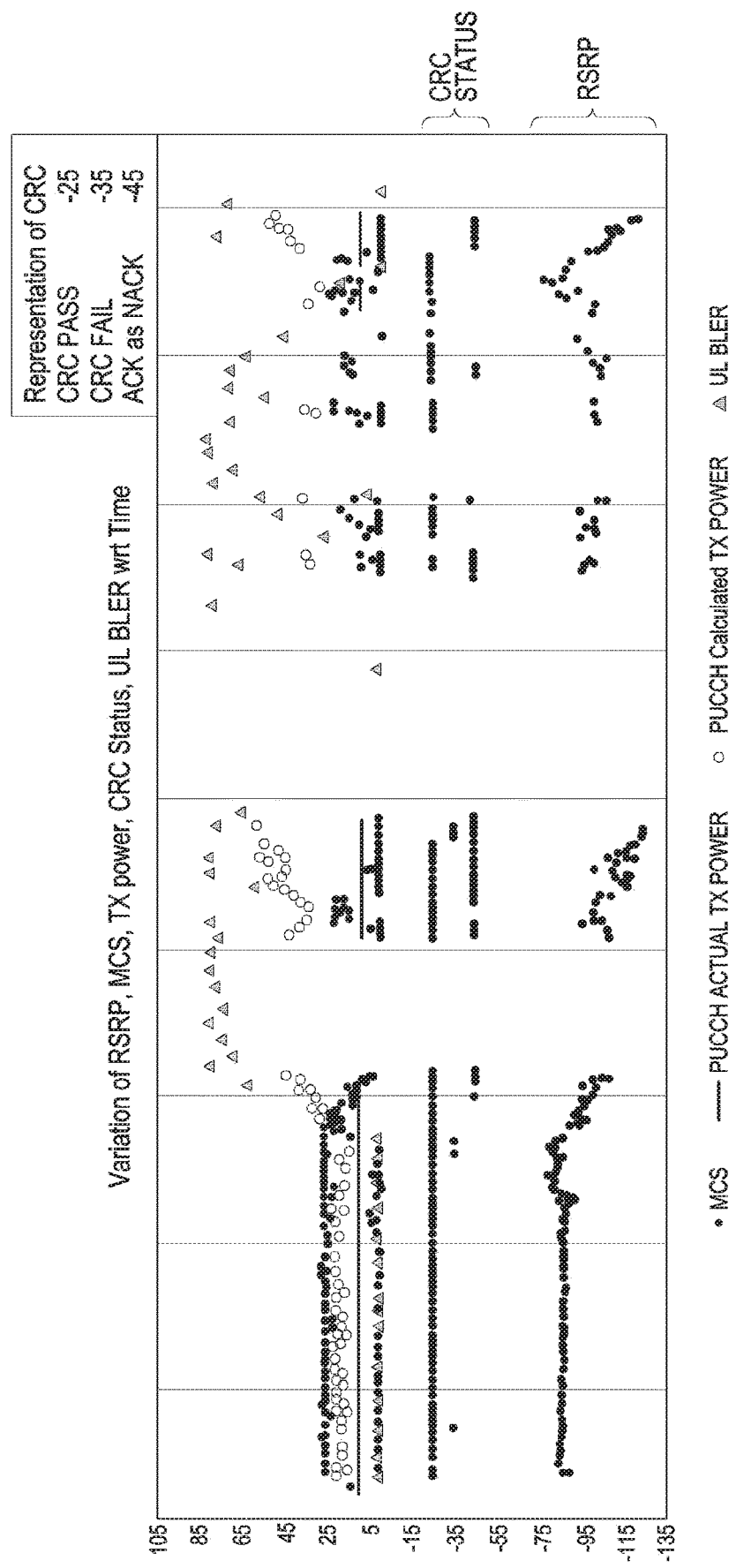

FIGS. 6A, 6B and 6C are use case graphs during managing removal and addition of NR cells in a UE, according to an embodiment. FIG. 6A shows a graph which depicts relation between a modulation and coding scheme (MCS) and a signalling measurement RSRP. As shown in the graph, as the RSRP reduces, the MCS is affected. FIG. 6B shows a graph depicting relation between an MCS (uplinkBLER), versus the signalling measurement (RSRP). As shown in the graph, the uplink block error rate and MCS are affected with poor RSRP. Likewise, FIG. 6C shows a graph which depicts changes in the MCS, transmission power, decoding status (e.g. error detection status such as cyclic redundancy check (CRC) status (CRC PASS or CRC FAIL or ACK/NACK)), and uplink BLER with changes in the RSRP.

Figure 7:
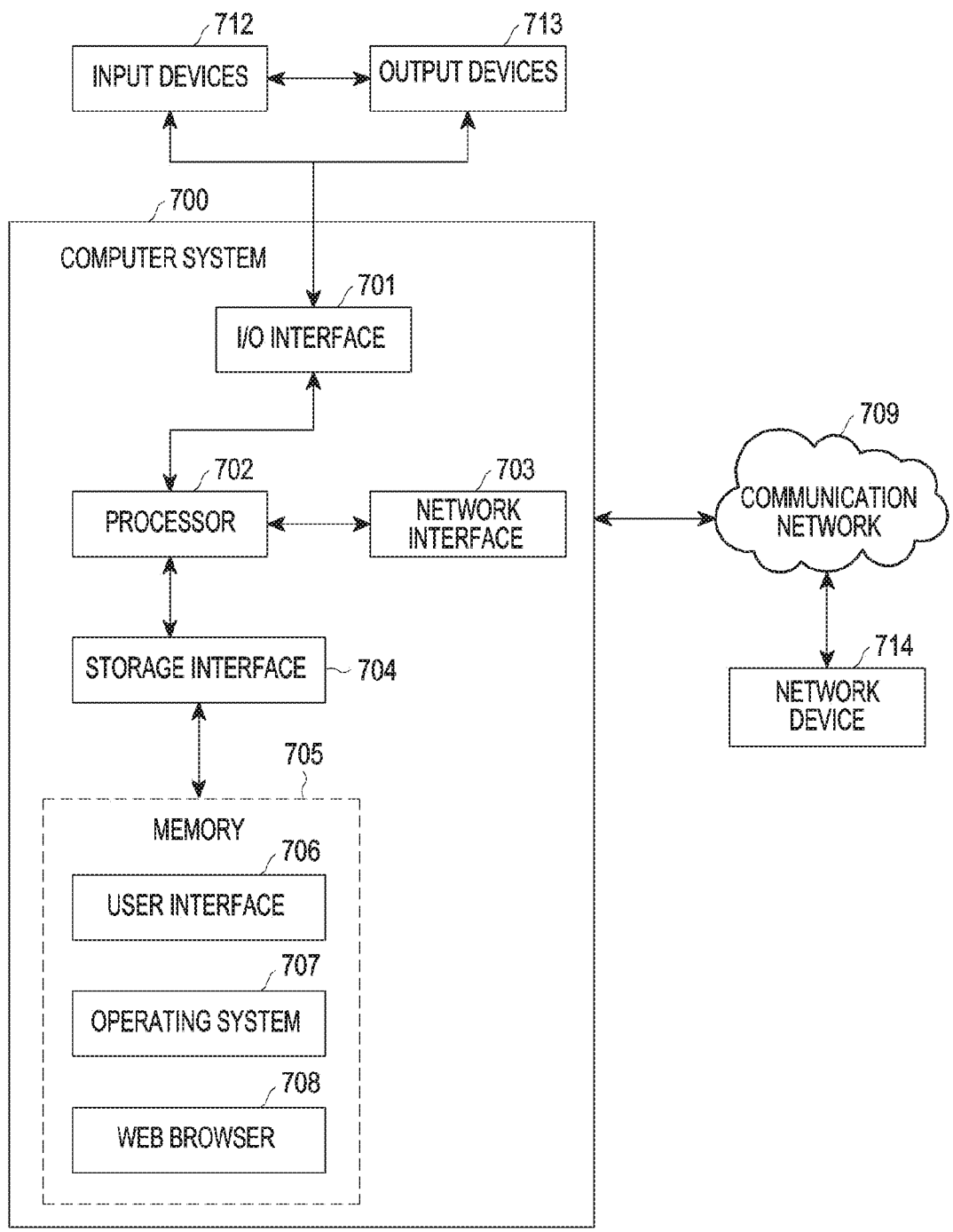
FIG. 7 illustrates a block diagram of a UE, according to an embodiment.

FIG. 7 illustrates a block diagram of a UE, according to an embodiment. The UE 700 may include a processor 702. The processor 702 may include at least one data processor for dynamically m configuring an SCG in a DC mode in a UE. The processor 702 may include specialized processing units such as, integrated system (bus) controllers, memory management control units, floating point units, graphics processing units, digital signal processing units, etc.

The processor 702 may be disposed in communication with one or more input/output (I/O) devices via I/O interface 701. The I/O interface 701 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), LTE, WiMax, or the like), etc.

Using the I/O interface 701, the user equipment 700 may communicate with one or more I/O devices. The input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, plasma display panel (PDP), organic light-emitting diode display (OLED) or the like), audio speaker, etc.

The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using wireless application protocol (WAP)), the Internet, etc. Using the network interface 703 and the communication network 709, the user equipment 700 may communicate with a network device 614. The network interface 703 may employ connection protocols include, but not limited to, direct connect, Ethernet (e.g., twisted pair 10/100/1000 Base T), TCP/IP, token ring, IEEE 802.11a/b/g/n/x, etc.

The communication network 709 includes, but is not limited to, a direct interconnection, an e-commerce network, a peer to peer (P2P) network, LAN, WAN, wireless network (e.g., using WAP), the Internet, Wi-Fi and such. The first network and the second network may either be a dedicated network or a shared network, which represents an association of the different types of networks that use a variety of protocols, for example, hypertext transfer protocol (HTTP), TCP/IP, WAP, etc., to communicate with each other. Further, the first network and the second network may include a variety of network devices, including routers, bridges, servers, computing devices, storage devices, etc.

The processor 702 may be disposed in communication with a memory 705 (e.g., RAM, ROM, etc.) via a storage interface 704. The storage interface 704 may connect to memory 705 including, without limitation, memory drives, removable disc drives, etc., employing connection protocols such as, serial advanced technology attachment (SATA), integrated drive electronics (IDE), IEEE-1394 USB, fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 705 may store a collection of program or database components, including, without limitation, user interface 706, an operating system 707 etc. User equipment 700 may store user/application data, such as the data, variables, records, etc., as described in this disclosure. Such databases may be implemented as fault-tolerant, relational, scalable, secure databases such as Oracle or Sybase.

The operating system 707 may facilitate resource management and operation of the user equipment 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACK-BERRY® OS, or the like.

In some embodiments, the user equipment 700 may implement a web browser 708 stored program component. The web browser 708 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure HTTPS, secure sockets layer (SSL), transport layer security (TLS), etc. Web browser 708 may utilize facilities such as AJAX™, DHTML™, ADOBE® FLASH™, JAVASCRIPT™, JAVA™, application programming interfaces (APIs), etc. The user equipment 700 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, NET™, CGI SCRIPTS™, JAVA™, JAVASCRIPT™, PERL™, PHP™, PYTHON™, WEBOBJECTS™, etc. The mail server may utilize communication protocols such as internet message access protocol (IMAP), messaging application programming interface (MAPI), MICROSOFT® exchange, post office protocol (POP), simple mail transfer protocol (SMTP), or the like. In some embodiments, the user equipment 700 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

The present disclosure avoids UEs from unnecessary heating without real performance or gain achieved over NR by removing the NR cell before the UE increases heat.

The UE performance will be better than or equivalent to the performance of an LTE standalone device.

The present disclosure helps in reducing battery consumption.

The present disclosure is easily implementable and UE specific without any changes in specifications of the UE.

Data stall issues are seen even when the UE is in good to medium coverage, and sometimes it is not comparable with default network. The present disclosure is useful for this type of scenario where PDCP aggregation is not supported by network.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

A method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof

What is claimed is:

1. A method performed by a user equipment (UE) in a dual connectivity (DC) mode, the method comprising:
 connecting to a primary cell and a secondary cell based on configurations received from a network;
 identifying whether at least one release condition for releasing a connection to the secondary cell is satisfied for a first predetermined time period which is determined based on performance of the UE with the secondary cell, the at least one release condition including at least one of a first condition that a reference signal received power (RSRP) for the secondary cell is less than a first threshold, a second condition that a block error ratio (BLER) for the secondary cell is greater than a second threshold, or a third condition that a transmission rate for the secondary cell is greater than a third threshold;
 releasing the connection to the secondary cell based on an identification that the at least one release condition is satisfied; and
 blocking transmission of a measurement report for the secondary cell in response to releasing the connection to the secondary cell for a second predetermined period which is determined based on performance of the UE when connected to the secondary cell.

2. The method of claim 1,
 wherein identifying whether the at least one release condition is satisfied comprises identifying whether at least one of the first condition that the RSRP is less than the first threshold for a first duration, the second condition that the BLER is greater than the second threshold for the first duration, or the third condition that the retransmission rate is greater than the third threshold for the first duration is satisfied.

3. The method of claim 1, wherein releasing the connection with the secondary cell comprises transmitting a radio link failure (RLF) message for the secondary cell to the network.

4. The method of claim 1, wherein a type of the primary cell is one of a long-term evolution (LTE) cell or a new radio (NR) cell, and a type of the secondary cell is one of the LTE cell or the NR cell, and wherein the type of the primary cell and the type of the secondary cell are the same or different.

5. The method of claim 1, wherein the primary cell is included in a master cell group (MCG), and the secondary cell is included in a secondary cell group (SCG).

6. A user equipment (UE) in a dual connectivity (DC) mode, comprising:
a transceiver; and
at least one processor configured to:
control the transceiver to receive configurations from a network,
connect to a primary cell and a secondary cell based on the received configurations,
identify whether at least one release condition for releasing a connection to the secondary cell is satisfied for a first predetermined time period which is determined based on performance of the UE with the secondary cell, the at least one release condition including at least one of a first condition that a reference signal received power (RSRP) for the secondary cell is less than a first threshold, a second condition that a block error ratio (BLER) for the secondary cell is greater than a second threshold, and a third condition that a retransmission rate for the secondary cell is greater than a third threshold,
release the connection to the secondary cell based on an identification that the at least one release condition is satisfied, and
block transmission of a measurement report for the secondary cell in response to releasing the connection to the secondary cell for a second predetermined period which is determined based on performance of the UE when connected to the secondary cell.

7. The UE of claim 6, wherein the at least one processor is further configured to:
identify whether at least one of the first condition that the RSRP is less than the first threshold for a first duration, the second condition that the BLER is greater than the second threshold for the first duration, or the third condition that the retransmission rate is greater than the third threshold for the first duration is satisfied.

8. The UE of claim 6, wherein the at least one processor is further configured to control the transceiver to transmit a radio link failure (RLF) message for the secondary cell to the network.

9. The UE of claim 6, wherein a type of the primary cell is one of a long-term evolution (LTE) cell or a new radio (NR) cell, and a type of the secondary cell is one of the LTE cell or the NR cell, and
wherein the type of the primary cell and the type of the secondary cell are the same or different.

10. The UE of claim 6, wherein the primary cell is included in a master cell group (MCG), and the secondary cell is included in a secondary cell group (SCG).

* * * * *